(12) United States Patent
Ohmura

(10) Patent No.: US 8,854,478 B2
(45) Date of Patent: Oct. 7, 2014

(54) DIGITAL CAMERA

(75) Inventor: Akira Ohmura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 129 days.

(21) Appl. No.: 13/137,513

(22) Filed: Aug. 23, 2011

(65) Prior Publication Data

US 2011/0310258 A1 Dec. 22, 2011

Related U.S. Application Data

(60) Continuation of application No. 12/591,496, filed on Nov. 20, 2009, now abandoned, which is a division of application No. 10/316,118, filed on Dec. 11, 2002, now abandoned.

(30) Foreign Application Priority Data

Dec. 12, 2001 (JP) ................. 2001-378430
Dec. 12, 2001 (JP) ................. 2001-378431
Dec. 12, 2001 (JP) ................. 2001-378433

(51) Int. Cl.
*H04N 5/225* (2006.01)
*H04N 1/00* (2006.01)
*H04N 1/21* (2006.01)

(52) U.S. Cl.
CPC ...... *H04N 1/0097* (2013.01); *H04N 2201/0084* (2013.01); *H04N 1/2112* (2013.01); *H04N 1/00127* (2013.01); *H04N 2201/3252* (2013.01); *H04N 2201/3205* (2013.01)
USPC ..................................... 348/207.1

(58) Field of Classification Search
USPC ............... 348/211.11, 231.99, 231.2, 231.6, 348/333.01, 333.02, 333.11, 207.1, 211.14, 348/231.7–231.9, 211.3
See application file for complete search history.

(56) References Cited

U.S. PATENT DOCUMENTS

| | | | |
|---|---|---|---|
| 6,006,039 A | 12/1999 | Steinberg et al. | |
| 6,204,877 B1 | 3/2001 | Kiyokawa | |
| 6,747,689 B1* | 6/2004 | No et al. ................ | 348/207.2 |
| 6,774,935 B1 | 8/2004 | Morimoto et al. | |
| 6,952,223 B2 | 10/2005 | Terashita | |
| 6,956,599 B2* | 10/2005 | Lim et al. ............... | 348/14.02 |
| 6,957,040 B1* | 10/2005 | Tanaka .................. | 455/3.06 |
| 8,120,669 B2* | 2/2012 | Meitav et al. .......... | 348/222.1 |
| 2001/0032335 A1* | 10/2001 | Jones ...................... | 725/105 |
| 2002/0030754 A1 | 3/2002 | Sugimoto | |
| 2003/0021591 A1* | 1/2003 | Grosvenor et al. ..... | 386/124 |
| 2003/0160870 A1* | 8/2003 | Ziemkowski .......... | 348/207.99 |
| 2004/0201687 A1* | 10/2004 | Perotti et al. .......... | 348/207.1 |
| 2005/0146621 A1* | 7/2005 | Tanaka et al. ......... | 348/211.2 |
| 2007/0252901 A1* | 11/2007 | Yokonuma et al. .... | 348/231.1 |

FOREIGN PATENT DOCUMENTS

| | | |
|---|---|---|
| JP | A-2001-008088 | 1/2001 |
| JP | A-2003-116041 | 4/2003 |

OTHER PUBLICATIONS

Jun. 18, 2010 Office Action issued in U.S. Appl. No. 12/541,496.
Feb. 23, 2011 Office Action issued in U.S. Appl. No. 12/541,496.

\* cited by examiner

*Primary Examiner* — Aung S Moe
(74) *Attorney, Agent, or Firm* — Oliff PLC

(57) ABSTRACT

A digital camera includes a communicator that communicates with other digital camera, a receiver that receives a camera information of another digital camera and an imaging device that forms a digital image of an object. The digital camera further includes a processor that creates a digital image data from the digital image based upon the camera information.

2 Claims, 18 Drawing Sheets

| Image Format | | | |
|---|---|---|---|
| | Memory card | Record media 2 | Record media 3 |
| Record media | | | |
| Recorded | Yes | Yes | No |
| Method | JPEG | JPEG | RAW |
| Size | 1048*800 | 640*480 | 1048*800 |
| Compression Ratio | Middle | Large | Middle |

DIGITAL CAMERA

This is a Continuation of application Ser. No. 12/591,496 filed Nov. 20, 2009, which is a Divisional of application Ser. No. 10/316,118 filed Dec. 11, 2002. The disclosure of the prior applications are hereby incorporated by reference herein in their entirety.

INCORPORATION BY REFERENCE

The disclosures of the following priority applications are herein incorporated by reference:

Japanese Patent Application No. 2001-378430 filed on Dec. 12, 2001;

Japanese Patent Application No. 2001-378431 filed on Dec. 12, 2001; and

Japanese Patent Application No. 2001-378433 filed on Dec. 12, 2001.

BACKGROUND OF THE INVENTION

1. Field of the Invention

The present invention relates to a digital camera which creates an image data.

2. Description of Related Art

In this field of the art, there is a digital camera having a function to transmit/receive an image data to and from another digital camera connected hereto with a cable or a wireless. And a digital camera with a function to transmit/receive can receive an image data and record it. But, a received image data is made up of an image size and a resolution that were created by a picture-taking digital camera and its size and resolution are different from those of an image data taken by a digital camera receiving an image. Therefore, in a case where a digital camera manages an image data taken by another digital camera as an image taken by its self, it will cause troublesome.

SUMMARY OF THE INVENTION

In order to overcome the problems and disadvantages, the invention provides a digital camera including a communicator that communicates with other digital camera, a receiver that receives a camera information of another digital camera and an imaging device that forms a digital image of an object. The digital camera further includes a processor that creates a digital image data from the digital image based upon the camera information.

According to another feature of this invention, a digital camera includes a communicator that communicates with another digital camera and a receiver that receives a digital image data from another digital camera. The digital, camera further includes a processor that creates a digital image file from the digital image data based upon an image format information.

According to still another feature of the invention, a digital camera includes a communicator that communicates with another digital camera a receiver that receives a digital image data from another digital camera. The digital camera further includes a processor that processes the digital image data received form another camera like a digital image data taken by the own digital camera.

According to a further feature of the invention, a digital camera includes a recording memory selector that selects a plurality of memory, a format selector that selects an image format information each the memory and an imaging device that forms a digital image of an object. The digital camera further includes a processor that creates a plurality of digital image data from the digital image based upon the image format information.

According to still further feature of the invention, a digital camera includes an imaging device that forms a digital image of an object, a communicator that communicates with other digital camera and a receiver that receivers an information refer of another digital camera. The digital camera further includes a comparator that compares a performance of this digital camera with a performance of another digital camera.

Other feature and advantages according to the invention will be readily understood from the detailed description of the preferred embodiments in conjunction with the accompanying drawings.

BRIEF DESCRIPTION OF THE DRAWINGS

FIG. 7 is a drawing to show a screen sample of a setting screen to set for recording an image data after shot in a plurality of recording media.

DETAILED DESCRIPTION OF THE PREFERRED EMBODIMENTS

An embodiment of an image data management system in accordance with this invention is explained as below.

Figure 1:
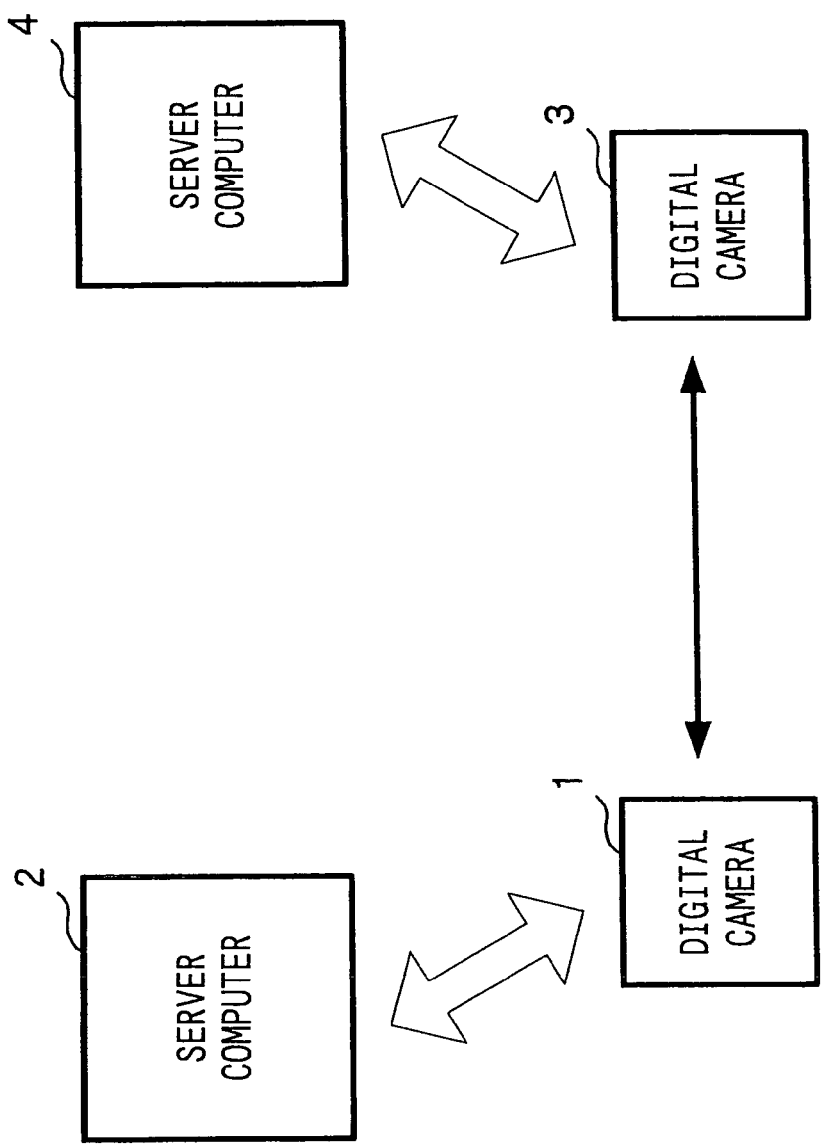
FIG. 1 is a block diagram showing a system configuration of an image data management system.

FIG. 1 is a block diagram showing the system configuration of an image data management system. The system of this invention comprises digital cameras 1 and 3 and server computers 2 and 4. Digital camera 1 and server computer 2 are electrically connected to each other through a network such as the Internet or so. Similarly, digital camera 3 and server computer 4 are electrically connected to each other through a network such as the Internet or so. In order that digital cameras 1 and 3 can communicate with server computers 2 and 4 via the Internet, an internet provider is necessary, but as it has nothing to do with this invention, an explanation of an internet provider is omitted here. Though FIG. 1 shows a system using Internet, this system may be realized by means of a network like LAN (stands for Local Area Network) or extranet or so. Digital cameras 1 and 3 can be electrically connected to each other via a wireless communication such like LAN, a blue truth or an Infrared communication. Digital camera 1 creates an image data made up of a digital data by photographing a subject. And digital camera 1 is connected to the Internet with a wireless or a cable, communicates with server computer 2 and transmits a created image data to server computer 2. Details of digital camera 1 are explained later by referring to FIG. 2. As digital camera 3 is the same as digital camera 1, an explanation of digital camera 3 is also omitted here.

Server computer 2 is a server including an image storage unit capable of storing an image data transmitted from digital camera 1. Server computer 2 has a database of information about interesting spots of sightseeing, theme parks and a map information and provides a web site to distribute information as a guide information. As server computer 4 is the same as server computer 2, server computer 4's explanation is omitted.

Figure 2:
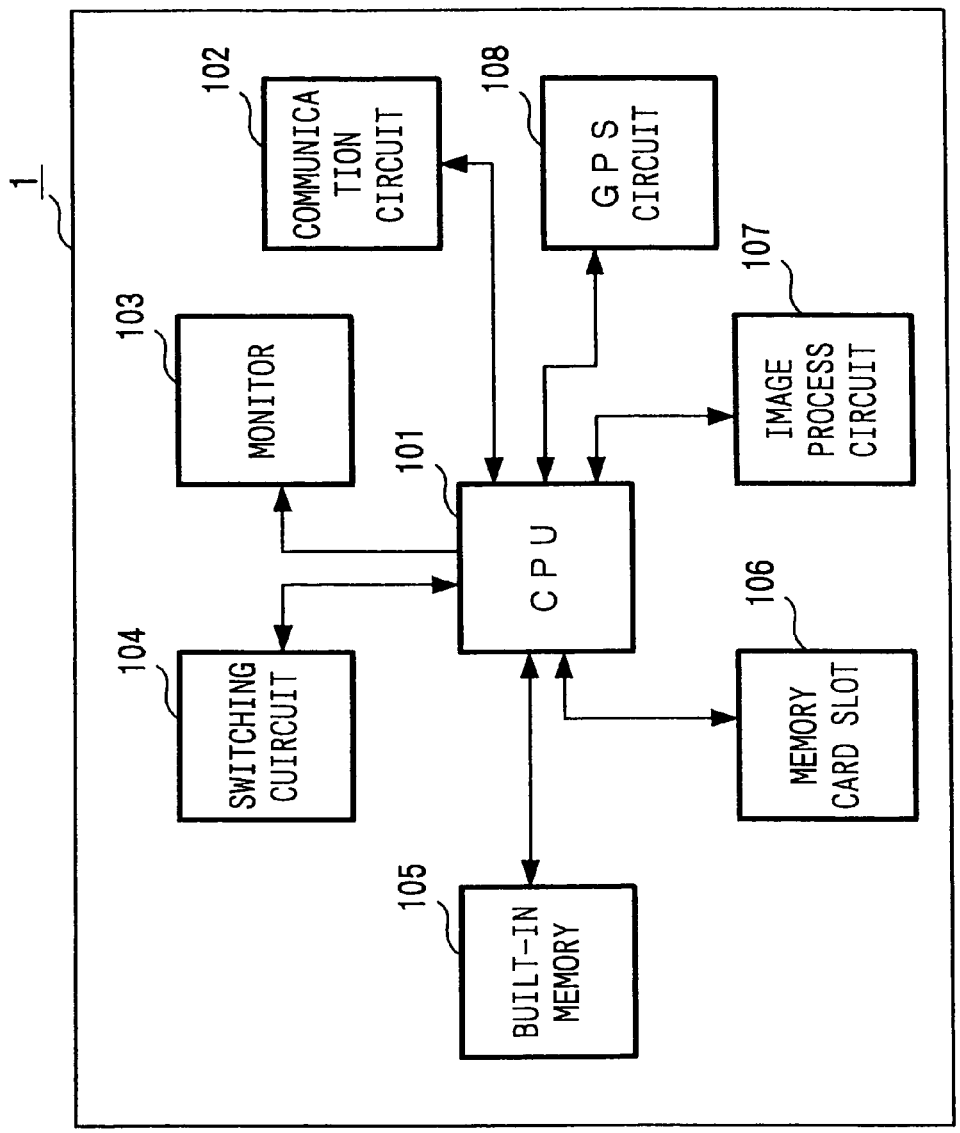
FIG. 2 is a block diagram showing an interior configuration of digital camera 1.

An inside configuration of digital camera 1 is explained as below. FIG. 2 is a function block diagram showing an inside configuration of digital camera 1. Digital camera 1 is provided with CPU 101, communication circuit 102, monitor 103, switching circuit 104, built-in memory 105, memory card slot 106, image processing circuit 107 and GPS circuit 108. But, it is a matter of course that in addition to the above, various circuits such as an imaging sensor and so forth are used. But, since they have nothing to do with this invention, the explanations of them are omitted.

CPU 101 manages circuits built in digital camera 1 and all operations of digital camera 1. Communication circuit 102 is connected to a network such as the Internet or so with a cable or a wireless and the one that transmits/receives a signal via a network such as the Internet. Digital camera 1 communicates with server computer 2 and other digital cameras via communication circuit 102. Monitor 103 is made up of LCD panel or so and displays a photographed image, a menu, a warning and so on. Switching circuit 104 is electrically connected to various buttons and switches provided in digital camera 1 and the one that detects the operations of various buttons and switches.

Built-in memory 105 is the one to hold a program data such as a firmware or so to control digital camera 1. Besides a program data, built-in memory 105 holds various kinds of data such as a site information or so. Memory card slot 106 writes in a photographed image data on a memory card in use. Image processing circuit 107 executes an image processing on an image data generated from an imaging sensor and also on an image data transmitted from other digital cameras. GPS circuit 108 is the one to detect a position information.

Figure 3:
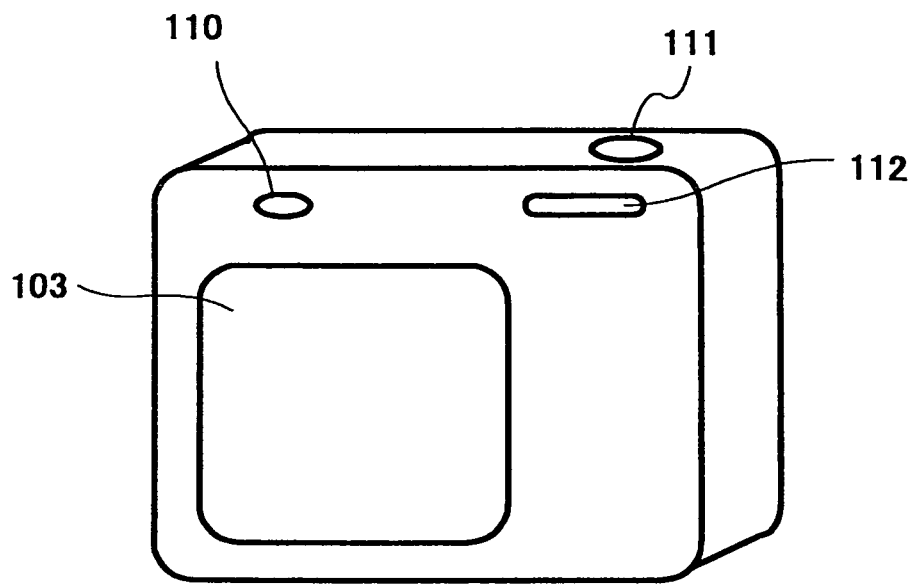
FIG. 3 is a perspective view of an exterior appearance of digital camera 1.

Next, Operating units/buttons and the like provided in digital camera 1 are explained. FIG. 3 is a perspective view of an exterior appearance of digital camera 1. Digital camera 1 is provided with monitor 103, shutter release button 111, communication button 110 and dial 112. Explanations of other units are omitted although they are also provided.

Shutter release button 111 is the one for use in shooting. Communication button 110 is the one used to start communication with another digital camera. Shutter release button functions as a two-way switch with a halfway and a full depression. Dial 112 is the one to select a parameter when various settings are set.

Via an operation of a button and/or a dial, various settings become possible. Digital camera 3 is also provided with the same functions and operating buttons/dial of digital camera 1. An operation of a digital camera in accordance with this invention is explained.

In a case where you want to take a picture (an image data) of you being a subject with your friend on a trip, for example, a third person is asked to release a shutter on behalf of you. In this case, if a third person takes the pictures respectively with each different digital camera which you and your friend(s) carries, each taken image data is recorded on each memory of digital cameras. And when a taken image data has been set to be transmitted to server computer 2, it will be transmitted to a given folder in a memory of server computer 2. However, when you need an image data that a subject to be taken is all members of a group, it would take much time to finish shooting as a picture must be taken with each camera and it might cause a third person lots of workload.

In a case where an image data of plural people as a subject was photographed with a single digital camera, they will be able to obtain an image data by transmitting or downloading it via a terminal such as a camera, a PC and so after getting home or at a staying hotel and so on. But, bits of operation skills to transmit or download are necessary, which might also become cumbersome.

Figure 4:
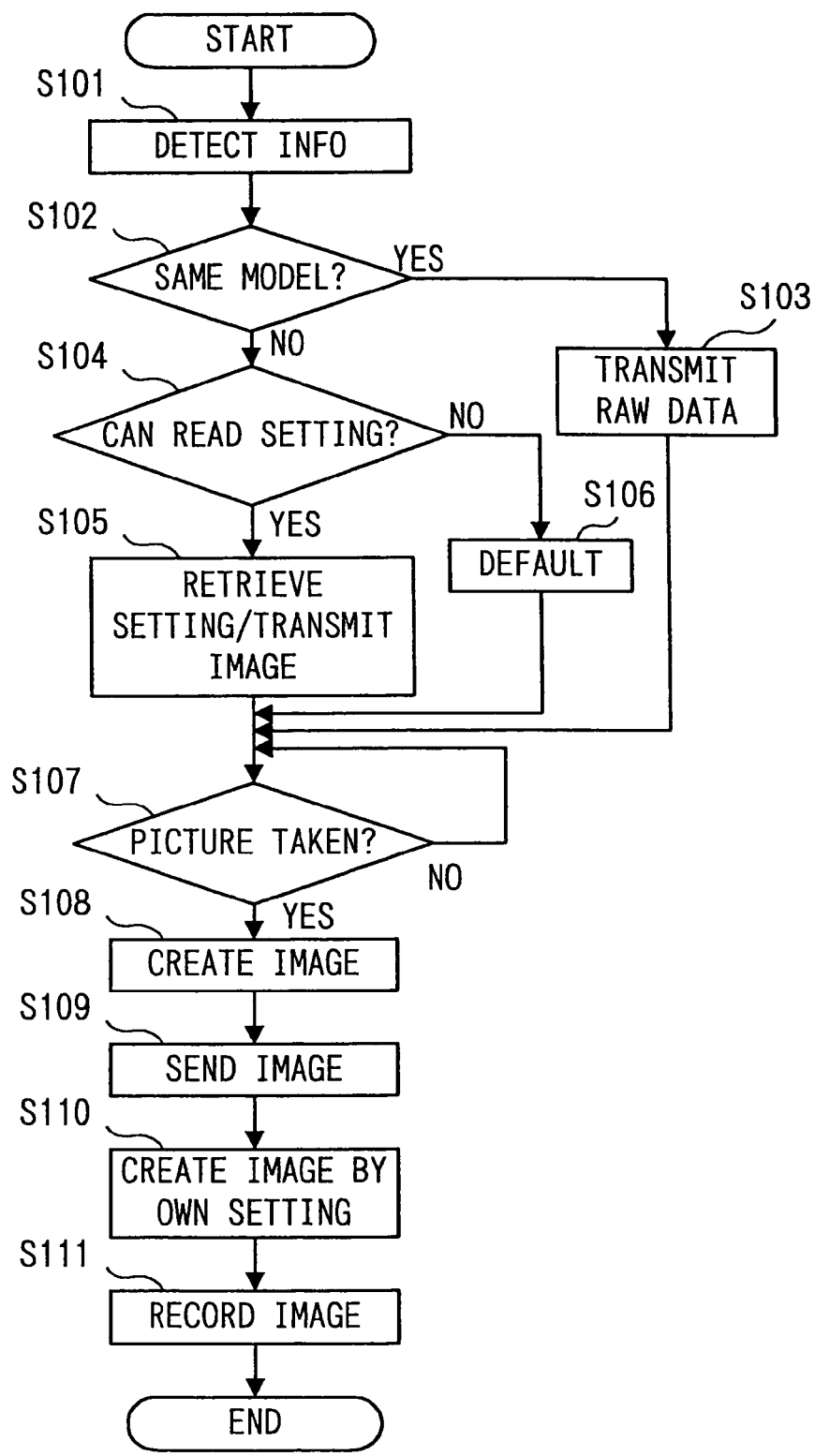
FIG. 4 is a flow chart of a transmission operation to be executed in digital camera 1.

A digital camera in accordance with the embodiment of this invention, in these cases, automatically transmits an image data to another digital camera of the other person when a digital camera takes a picture. An operation to transmit an image data to another digital camera is explained below. Specifically, an embodiment of an operation to transmit an image data from digital camera 1 to digital camera 3 is explained. FIG. 4 is a flowchart of a transmitting operation to be executed in digital camera 1. A flow of FIG. 4 starts when digital camera 1 is electrically connected to digital camera 3 of a receiving end in a state of being capable of communicating with digital camera 3 by a wireless. According to this embodiment, by operating a button corresponding to communication button 110 of digital camera 1 respectively, communication starts between each digital camera.

In step S101, digital camera 1 starts communication with digital camera 3 of a receiving end and detects information about a camera maker, a product model and so on. In step S102, it is detected if digital camera 3 is the same model of digital camera 1 and if yes, a flow proceeds to step S103 and if not, a flow proceeds to step S104.

In step S103, when digital camera 3 is the same model of digital camera 1, a RAW data is set to be transmitted. A RAW data is an image-recording method that an imaging data generated from an imaging sensor is recorded as an image data almost as it is. A RAW data has no versatility since a method of a RAW data depends on a maker. Thus, as it is impossible to reproduce a RAW data with a different camera maker and a different model, a processing of a size change, compression and so can not be executed on an image data.

The reason why a RAW data is transmitted is that an image processing can be executed on a non-degraded image data by transmitting a RAW data to the same digital camera. In step S104, it is detected if digital camera 3 is a model capable of reading out a picture-taking setting information and if yes, a flow proceeds to step S105 and if not, a flow proceeds to step S107. A model capable of reading out a picture-taking setting information is a digital camera that is so designed beforehand as to enable to read out a picture-taking setting information.

In step S105, a picture-taking setting information of digital camera 3 is retrieved and an operation to transmit an image data according to the retrieved picture-taking setting is set.

In step S106, an image data with a predetermined image size and a compression ratio is set to be transmitted. In step S107, it is detected if a picture was taken and if yes, a flow proceeds to step S108 and if not, detection continues. In step S108, an image data is created in accordance with an established picture-taking setting. In step S109, an image data is transmitted to digital camera 3. In step S110, an image data is created in accordance with a picture-taking setting of digital camera 1 itself. In step S111, a created image data is recorded on a memory according to a setting.

In this way, a received image data is compressed according to a picture-taking setting and a compressed image data is recorded on a memory card and transmitted to server computer 2. When connected digital camera 3 is the same model of digital camera 1, as an image processing such as a compression and so becomes unnecessary in digital camera 1 by transmitting a RAW data to digital camera 3, a processing workload of digital camera 1 can be reduced. An image data created for digital camera 1 itself can be set to be transmitted to server computer 2, not to be recorded in digital camera 1.

In the above embodiment, a digital camera will create an image data that is going to be recorded in the digital camera taking a picture after transmitting an image data, an image data may be transmitted after creating the image data to be recorded in the digital camera.

Figure 5:
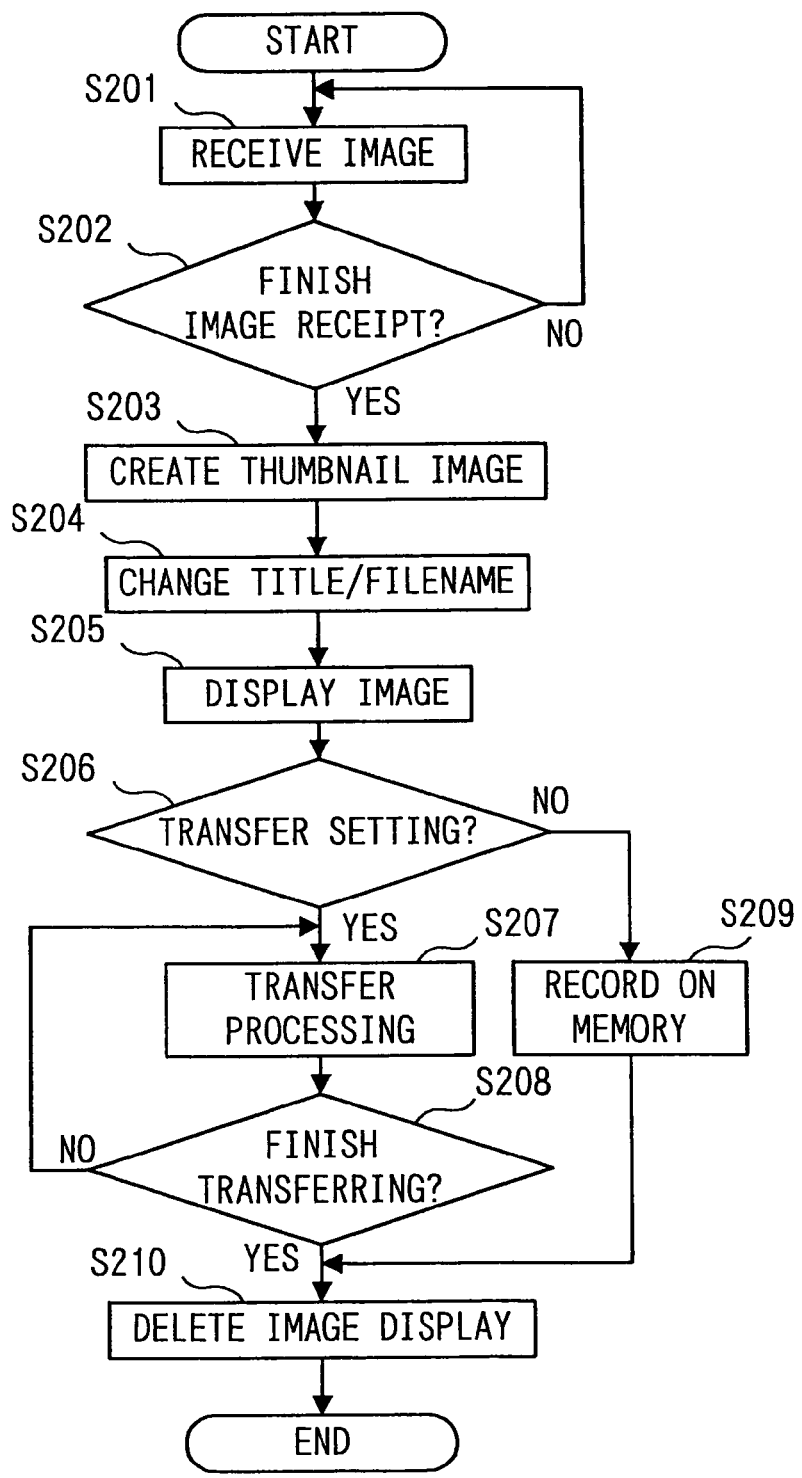
FIG. 5 is a flow chart of an image data record operation to be executed in digital camera 1.

And next, an operation to record an image data transmitted from another digital camera, for example, digital camera 3 on a memory of digital camera 1 or to automatically transmit an image data to server computer 2 is explained. FIG. 5 is a flow chart of an image data record-operation to be executed in digital camera 1. A flow of FIG. 5 starts when digital camera 1 detects transmission of an image data from digital camera 3.

In step S201, an image data is received. A received image data is temporarily stored into built-in memory 105. In step S202, it is detected if reception of an image data is finished and if yes, a flow proceeds to step S203 and if not, a flow heads back to step S201.

In step S203, an image size change and compression are processed on a received image data in accordance with an image size change and compression determined by a picture-taking setting of digital camera 1. And a thumbnail image of a received image data is created and is stored into built-in memory 105.

In step S204, a title and a filename added to a received image data are changed according to a setting of digital camera 1. Instep S205, a received image data is displayed on monitor 103. In step S206, it is detected if transfer of a received image data outside is set and if yes, a flow proceeds to step S207 and if not, a flow proceeds to step S209.

In step S207, an image data is transferred to server computer 2. In step S208, it is detected if transfer of an image data is finished and if yes, a flow proceeds to step S210 and if not, a flow heads back to step S207 and a transfer processing of an image continues.

In step S209, an image data is recorded on a memory card inserted into memory card slot 106. In step S210, by deleting an image displayed on monitor 103, it is noticed that a recording is ended. Or, a record-end message may be displayed respectively with each recording media.

Like this, by recording an image data according to a record setting set by digital camera 1 at a time of shooting, even a transmitted image data can be recorded with the same image size and compression ratio as those of an image data taken by digital camera 1. And in a case where an image data is transmitted from digital camera 3 to server computer 2, information about a connecting end and an authentication information and so to thereby connect to server computer 2 and thereby record an image data must be set. But, as in the above, by controlling a transmission via digital camera 1 itself, an image data can be transmitted to server computer 2 with ease in accordance with information about a connecting end and an authentication registered in digital camera 1. And, as there is no necessity to set an authentication information or the like in digital camera 3, an authentication information or the like registered in digital camera 1 can be prevented from leaking.

Also, by storing a thumbnail image of an image data transmitted to server computer 2 into built-in memory 105 in digital camera 1, a summary of an image data transmitted to server computer 2 can be confirmed without gaining access to server computer 2.

As described in the above, by operating a button or the like of another camera corresponding to communication button 110 of digital camera 1 in a same way as operated in digital camera 1, information about a picture-taking setting of another party's digital camera becomes automatically set to be read out and also an image data becomes automatically set to be transmitted to another party's digital camera. It is not necessary to set which digital camera is used to take a picture, transmits an image data and receives it. An image data is controlled to be transmitted from a digital camera taking a picture to a digital camera not taking.

In the meantime, a digital camera to transmit an image data and a digital camera for receiving it may be set respectively. And an image data taken by one digital camera may be set to be recorded on both digital cameras and an image data taken by one digital camera may be set to be recorded only on another digital camera.

When shooting, a use of a digital camera ensuring a high-quality image data is recommended. Because an image data taken by a camera of quality ensuring an image data of high image quality can be downgraded to an image data shot by a digital camera of low quality, but can not vice versa.

Figure 6:
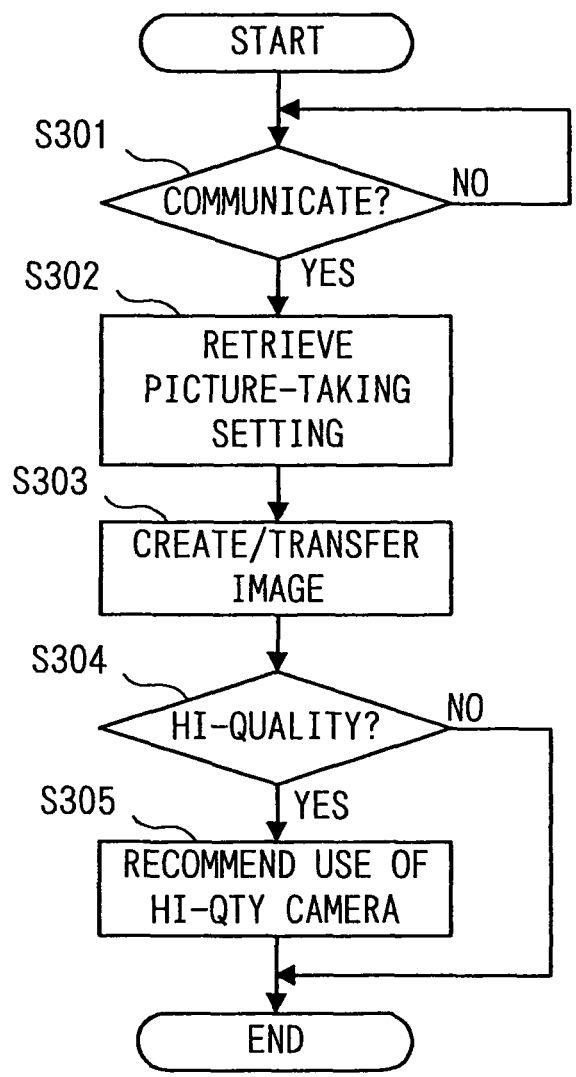
FIG. 6 is a flow chart of an operation to be executed in digital camera 1.

When a camera is set in a transmission mode, by performing again an operation to set a camera in a transmission mode, a transmission mode can be set off. An operation in a transfer mode is concretely explained below. FIG. 6 is a flow chart of an operation to be executed in digital camera 1. A flow of FIG. 6 starts by operating a button for transfer provided in digital camera 1. Suppose that digital camera 1 communicates with digital camera 3.

In step S301, it is detected if a communication of digital camera 1 with digital camera 3 is established and if yes, a flow proceeds to step S302 and if not, detection continues. In step S302, a picture-taking setting set in digital camera 3 is retrieved. In step S303, an image data is set to be created according to a retrieved picture-taking setting and a created image data is set to be transferred to digital camera 3.

In step S304, which camera is superior in quality, digital camera 3 or 1 is judged and when digital camera 1 is judged to be superior, a flow ends and when digital camera 3 is judged to be superior, a flow proceeds to step S305. For example, a criterion to judge superiority herein is a number of a pixel of an imaging sensor. In step S305, it is set to display a message on LCD panel 103 in a picture-taking mode saying that a use of a digital camera of the communicating partner can ensure an image data of higher image quality.

As controlled in the above, a taken image data can be so set as to be automatically transferred to digital camera 3. In a digital camera of the above embodiment, with a simple operation only, an image data is automatically transferred to other digital camera. A digital camera of the embodiment, which is explained next, can set to record an image data obtained by one shot on two different memories and over. Further, it can set an image size and a resolution of an image data for each memory on which an image data will be recorded.

Now, a record-setting operation of digital camera 1 is explained. FIG. 7 is a diagram showing a screen sample of setting for recording an image data on plural media. A setting screen shown in FIG. 7 is displayed on monitor 103 of digital camera 1.

In a "Recording medium" of FIG. 7, a memory card inserted into a digital camera, other digital camera, a server computer and the like on which a photographed image data is recorded are enumerated, wherein a recordable medium is listed. In a "Recorded", a medium on which an image data will be recorded can be set by Yes and No. An image data will be recorded on a medium with Yes while it won't be recorded on an No-marked medium.

In a "Method" of FIG. 7, that is, a file method of an image data can be set respectively on each recordable medium. A recording file method to record an image data, such as a JPEG method, non-compression, a RAW data and so on is selected and a selected method is set. With regard to a "Size" of FIG. 7, an image size of an image data to be recorded can be set respectively on each recordable medium. A compression ratio which will perform a processing of compression on an image data can be also set respectively on each recordable medium.

These settings get done via an operation of a button and a dial of digital camera 1. Digital camera 1 creates an image data in compliance with contents of a setting determined at each recording medium and manages a transmission of a created image data so as to be recorded on a plurality of recording medium.

Figure 8:
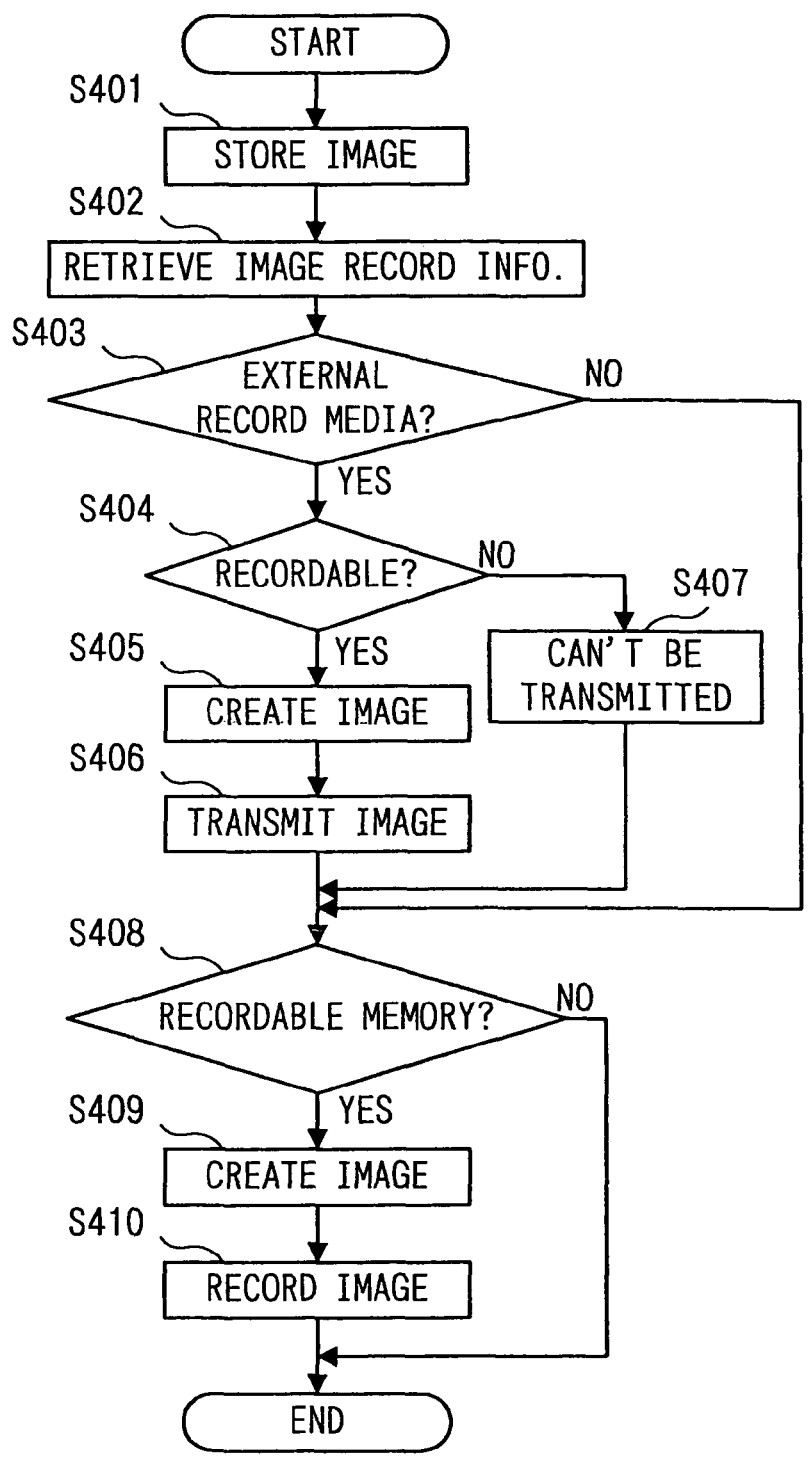
FIG. 8 is a flow chart of a record operation to be executed in digital camera 1.

To have an image data recorded on a plurality of recording medium, an operation to be executed in digital camera 1 is explained. FIG. 8 is a flow chart showing a record operation to be executed in digital camera 1. A flow of FIG. 8 starts by detecting a full depression of shutter release button 111.

In step S401, a taken image data is stored into built-in memory 105. In step S402, a record-setting information of a recording medium is retrieved. In step S403, it is detected if an external memory is selected as a recording medium and if yes, a flow proceeds to step S408.

In step S404, it is detected if an external memory is recordable and if yes, a flow proceeds to step S405 and if not, a flow proceeds to step S407. In step S405, an image data is created in accordance with a record-setting of an external receiving end. In step S406, a created image data is transmitted and monitor 103 displays that an image data is being transmitted. In step S407, a receiving end to which an image data can not be transmitted and a message saying that an image data can not be transmitted are displayed on monitor 103.

In step S408, it is detected if a memory card is selected as a recording medium and if yes, a flow proceeds to step S409 and if not, a flow ends. In step S409, an image data is created in compliance with a record-setting of a memory card. In step S410, a created image data is recorded on a memory card. Also, a description saying that a created image data is recorded on a memory card is displayed on monitor 103.

In the above operation, an external receiving end to which an image data is transmitted is asked if a recording medium is recordable after photographing, but it may be asked before photographing. In this way, by making it possible to set each record-setting against a plurality of the receiving ends, an image size and a compression ratio of an image data necessary at a receiving end can be set and then an image data can be recorded accordingly on each recording medium in accordance with each established record-setting. This operation can prevent an image data from wastefully degrading as a once-compressed image data is extended and the extended image data is not compressed again after change of an image size.

A guide information view function of digital camera 1 is explained. Digital camera 1 is provided with a view function to show a guide information on monitor 103. A guide information provides information about interesting spots in a theme park and a sightseeing, maps and so on and is stored into server computer 2 and is sent to digital camera 1 via the Internet. Or, not via the Internet, for example, a guide information has been recorded beforehand on a memory card to be inserted into memory card slot 106 and a recorded memory card may become available. A memory card recorded with a guide information may be marketed for sale or given away free to a participant by a tourist firm. Or by not providing a memory card recorded with a guide information, a guide information may be downloaded for pay. According to this online service, a guide information may be used even in a digital camera with no function to thereby gain access to the Internet.

Figure 9:
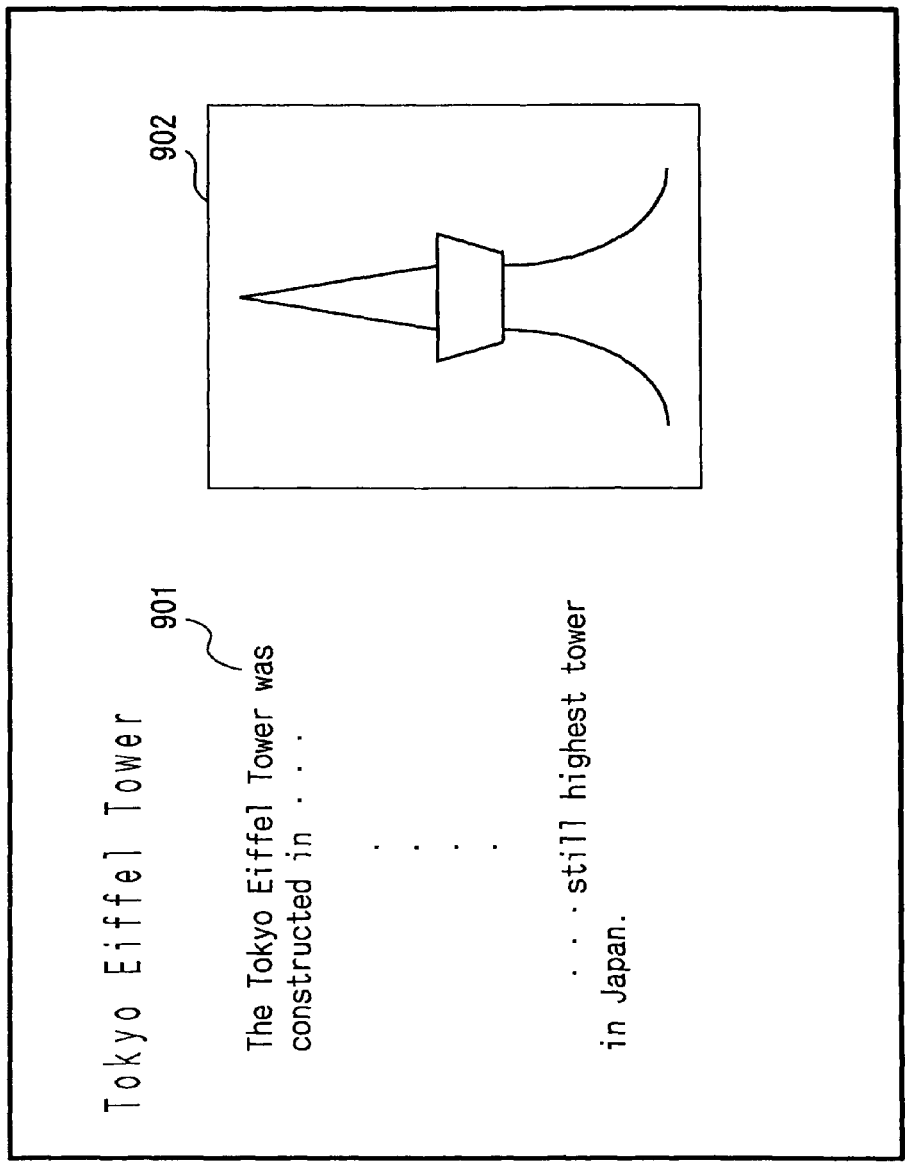
FIG. 9 is a drawing to show a display sample of a guide information.

Digital camera 1 is provided with a picture-taking mode to take a picture, a reproduction mode to reproduce a taken image data and a guide mode to view a guide information. Digital camera 1 shows a guide information on monitor 103 when set in a guide mode. A guide information is the one that is written in HTML method, and browsing software to view a guide information is stored in digital camera 1. FIG. 9 illustrates an example of a guide information. In text column 901 of FIG. 9, information about interesting spots and so forth appears by a text and in image column 902, an image information about a photo, an illustration and the like appears.

And by depressing halfway shutter release button 111 when digital camera 1 is set in a guide mode, a guide mode of digital camera 1 is automatically changed over to a picture-taking mode. Thus, we don't miss a point of a shutter release. Also, a sightseeing guide information usable during a trip is stored into server computer 2, which provides a guide information and an image data storage service for enabling a user to store a taken image data.

Via a digital camera, a guide information can be viewed by retrieving it from server computer 2, and a traveler can go sightseeing by referring to a guide information. Server computer 2 receives a GPS information output by GPS built in digital camera 1 and automatically sends a guide information according to the received GPS information to digital camera 1. Also, by not automatic distribution, it may be possible to specify a necessary guide information and have the specified information send.

Digital camera 1 can store a taken image data by relating it to a guide information. By this relation, details of an image data such as a picture-taken place, date/time etc can be available by referring to a related guide information without taking a time to create a filename and a title of an image data each time.

An operation of digital camera 1 is explained. Taking an example, when a guide information about the Tokyo Eiffel Tower is viewed and shutter release button 111 is depressed halfway, a screen on monitor 103 is changed over to an image data generated by an imaging sensor from a guide information. When a picture is taken, a page data looking as if an image data is pasted into a guide information on view shortly before a shot was taken is created. Or, a filename of an image data relating to a title of a guide information is created.

For example, in a guide information written by HTML method, a HTML-method image data pasted in a guide information is replaced with a taken image data. And then, a created HTML-method image data is recorded into a folder of digital camera 1.

And, a tourist attendant amends an itinerary if it is changed. An amendment is made at a unit of a minute. Thus, after shot, a photo album can be edited by referring to an itinerary and a date/time information of a taken picture. An operation about a guide information is concretely explained.

Figure 10:
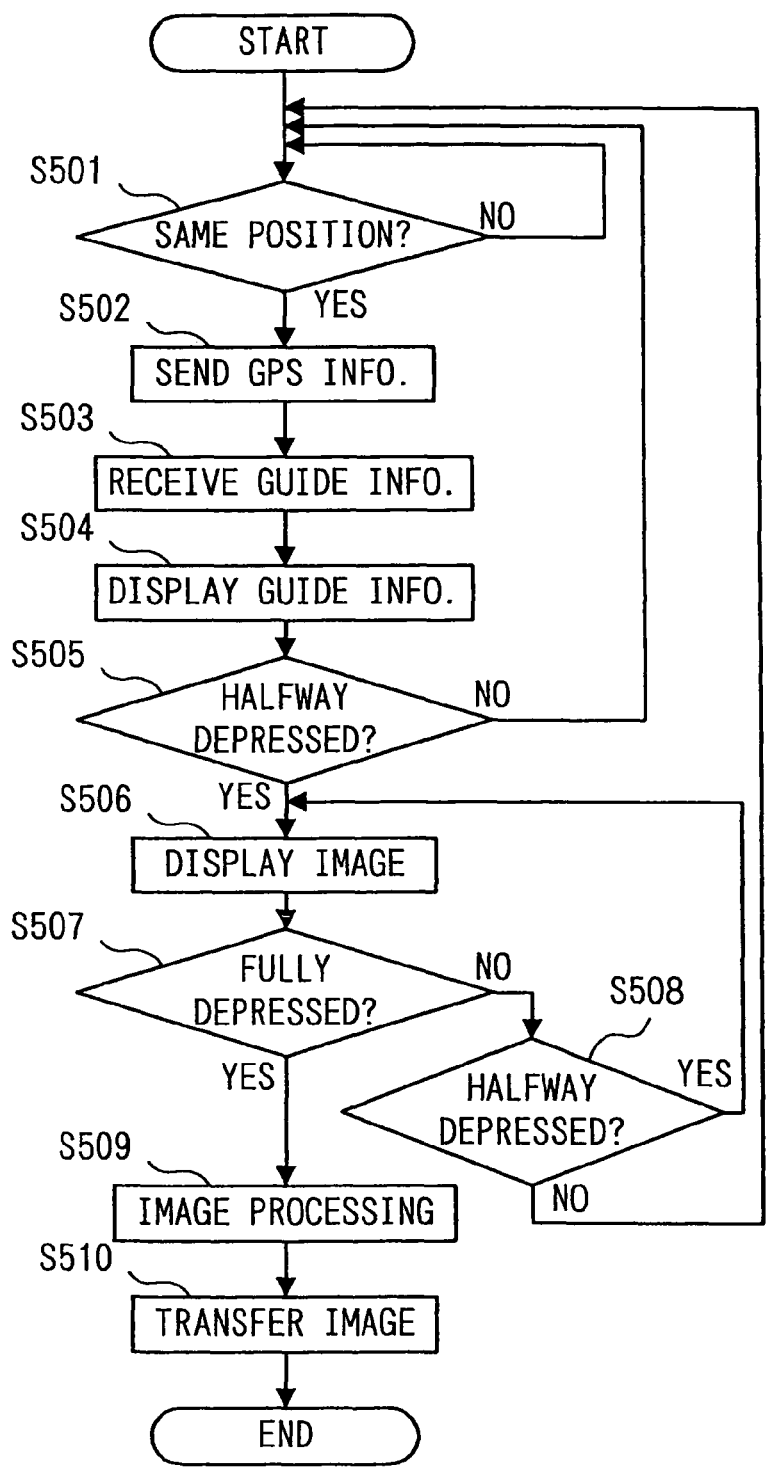
FIG. 10 is a flow chart of an operation to be executed in digital camera 1.

An operation to be executed in digital camera 1 is explained. FIG. 10 is a flow chart showing an operation to be executed in digital camera 1. A flow of FIG. 10 starts when a camera is set in a guide mode. In step S501, it is detected if a position information detected by a GPS remains unchanged and if a change is detected, a flow proceeds to step S502 and if not, detection continues.

In step S502, a GPS information is sent to server computer 2. In step S503, a guide information is received from server computer 2. In step S504, the received guide information is displayed on monitor 103. And in step S505, it is detected if shutter release button 111 is depressed halfway and if yes, a flow proceeds to step S506 and if not, a flow heads back to step S501.

In step S506, a guide information displayed on monitor 103 is changed to an image data output by an imaging sensor. In step S507, it is detected if shutter release button 111 is fully depressed and if yes, a flow proceeds to step S509 and if not, a flow proceeds to step S508. In step S508, it is detected if a half-depression of shutter release button 111 is cancelled and if yes, a flow proceeds to step S501 and if not, a flow gets back to step S507.

Figure 11:
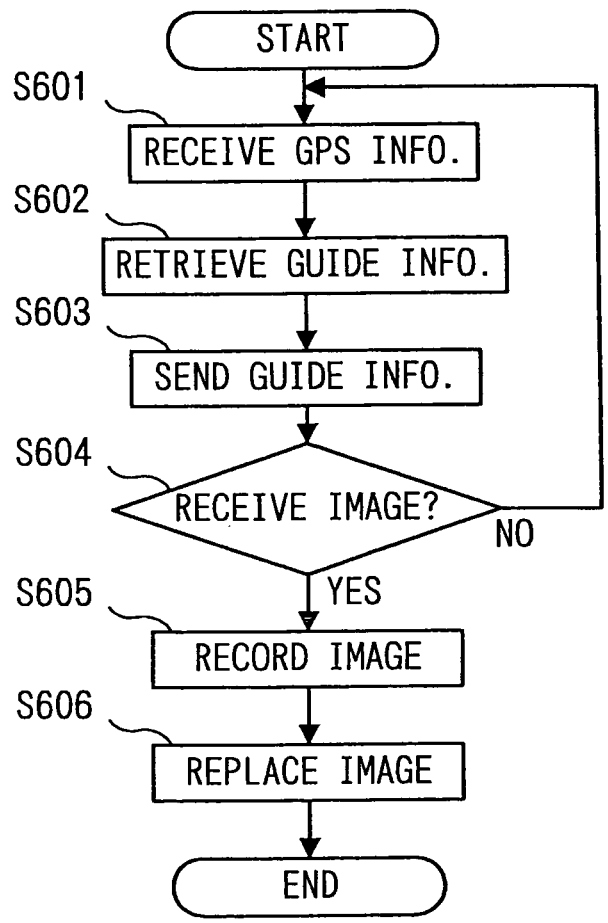
FIG. 11 is a flow chart of an operation to be executed in server computer 2.

In step S509, an image processing is executed in accordance with a picture-taking setting. In step S510, an image data created by an image processing is transferred to server computer 2. An operation to be executed in server computer 2 is explained. FIG. 11 is a flow chart showing an operation to be executed in server computer 2. A flow of FIG. 11 starts by detecting a transmission of a GPS information from digital camera 1.

Figure 12:
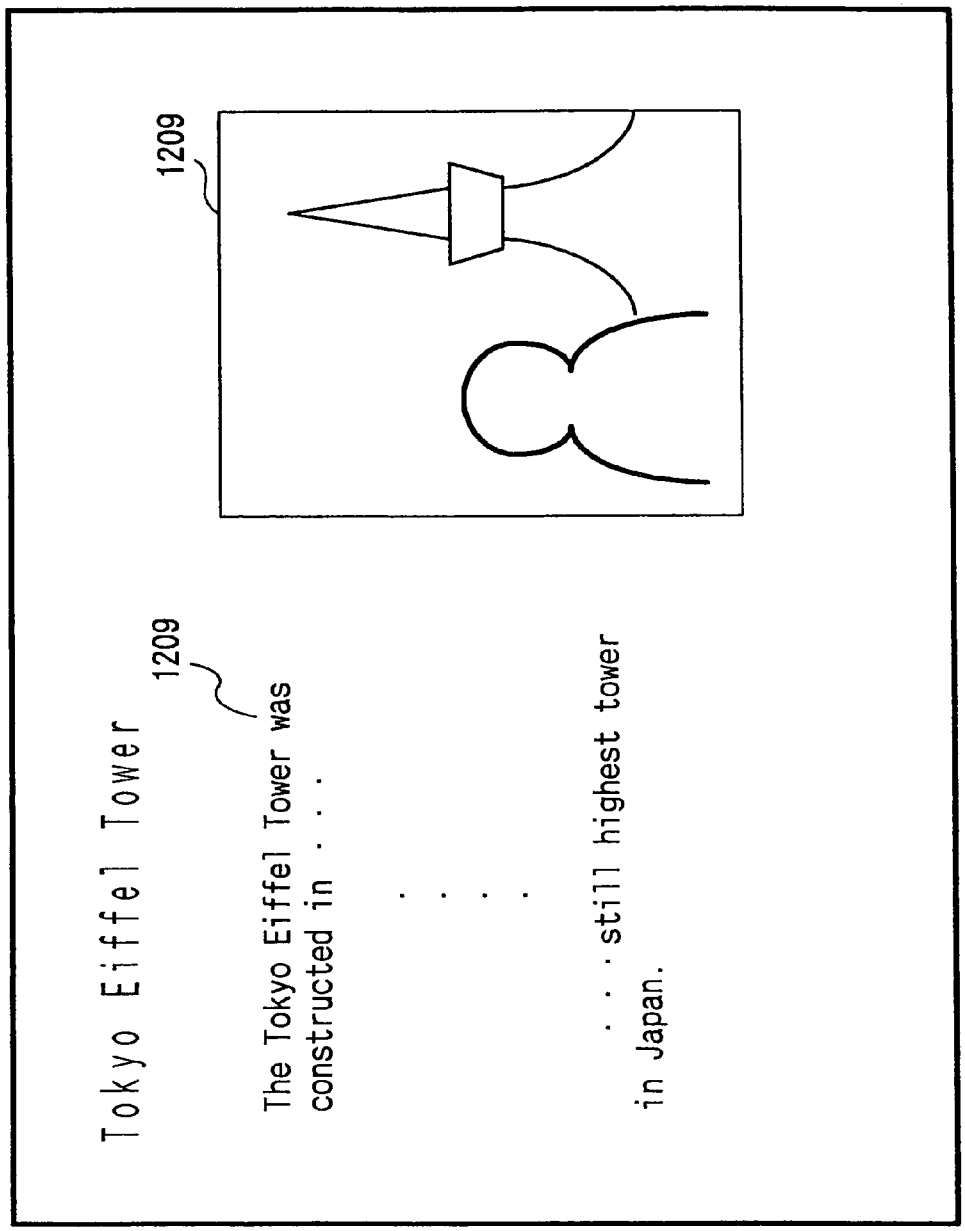
FIG. 12 is a drawing to show a display sample of an album page.
Figure 13:
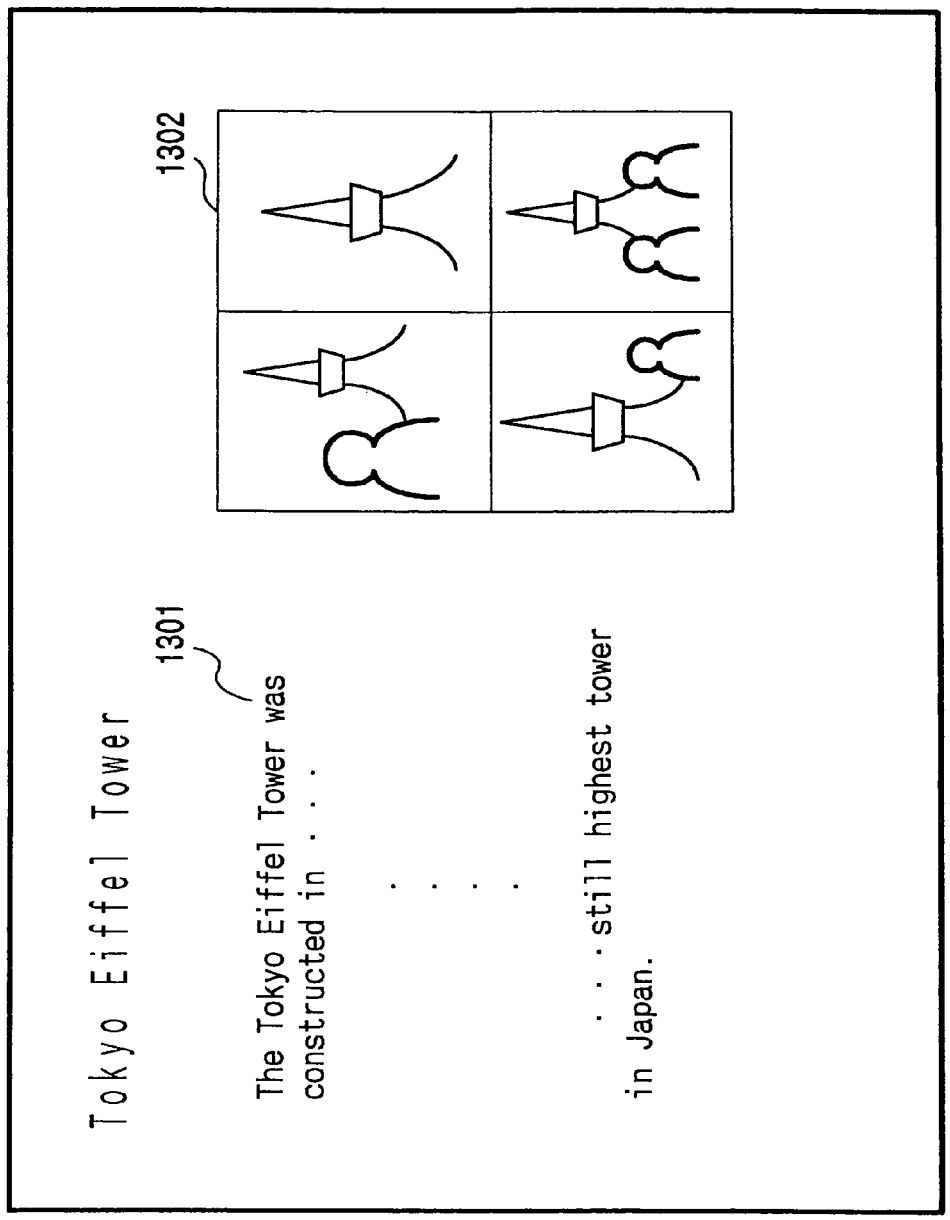
FIG. 13 is a drawing to show a display sample of an album page.

In step S601, a GPS information is received. In step S602, a guide information corresponding to a GPS information is retrieved. In step S603, the retrieved guide information is transmitted to digital camera 1. In step S604, it is detected if an image data is received and if yes, a flow proceeds to step S605 and if not, a flow gets back to step S601. In step S605, a received image data is recorded. Instep S606, an image data created by HTML method on the page of a guide information is replaced with an image data received from digital camera 1. More concretely, the contents of a text in text column 901 on the page of a guide information illustrated by FIG. 9 remain the same, but an image in image column 902 is replaced with an image data gained by a picture taking. FIG. 12 shows a display example of an album page. In text column 1201 of FIG. 12, a text in text column 901 of FIG. 9 is appeared as it is and in image column 1202, an image data in image column 902 of FIG. 9 is replaced with a gained image data.

In a case where a plurality of pictures are taken at a spot of a guide information appearing with a single image data, a plurality of pictures may be so edited as to appear in a guide information although a layout of the guide information may change. Also, it may be set in such a way that each image data to appear in image column 1302 are scaled down in accordance with a number of pictures and a plurality of scaled-down image data appear therein without changing a layout.

And server computer 2 does not determine a guide information to be transmitted to digital camera 1 based upon a GPS information, but can determine a guide information in compliance with a user's itinerary of digital camera 1. As server computer 2 stores an itinerary information, it distributes a guide information based on an itinerary information and a time schedule information. Namely, a guide information is set to be distributed at a time when a user on a trip in accordance with an itinerary badly needs a guide. For example, in a case where a user is scheduled to end a tour to the Imperial Palace at three in the afternoon and visit the Tokyo Eiffel Tower from 3:30 PM, a distribution of a guide information about the Tokyo Eiffel Tower is set at 3:30 PM. And as there may be no time to gain information about the Tokyo Eiffel Tower ahead of 3:30 PM distribution, a distribution may be set at twenty minutes past three in the afternoon or 3:00 PM at which a tour to the Imperial Palace will be ended. When an itinerary deviates from the original one or changes, a tour attendant and the like can respond to a deviation or a change by adjusting an itinerary via a terminal.

Figure 14:
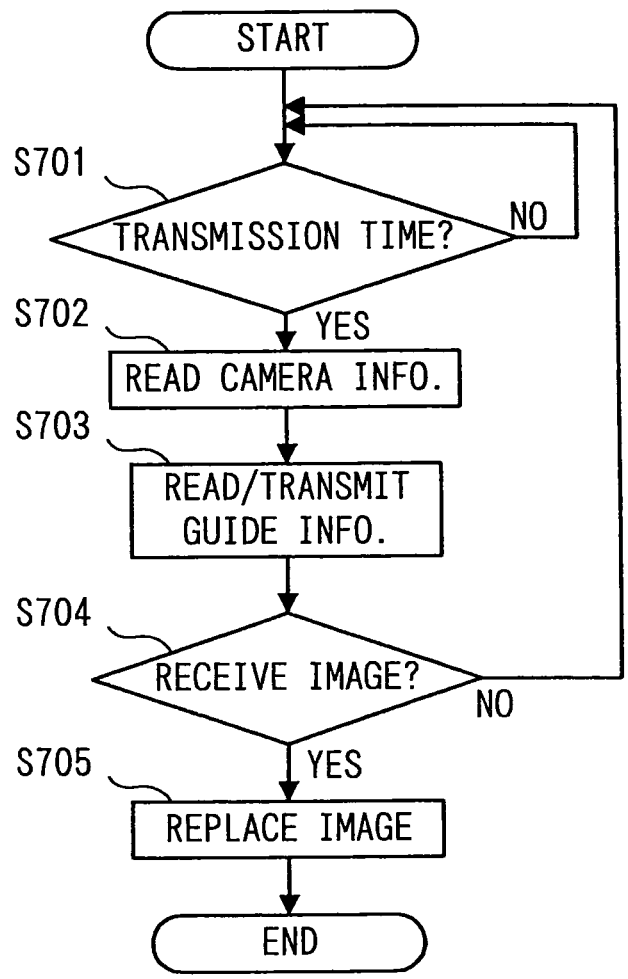
FIG. 14 is a flow chart of an operation to be executed in server computer 2.

An operation to transmit a guide information according to an itinerary is explained. An itinerary information has been recorded beforehand on a memory in a state of being related to a guide information. FIG. 14 is a flow chart of an operation to be executed in server computer 2.

In step S701, an itinerary is monitored and it is detected if it is time to transmit a guide information and if yes, a flow proceeds to step S702 and if not, detection continues. In step S702, a camera information about a user's digital camera registered in response to an itinerary is read out. A digital camera registered in response to an itinerary is the one that a user participating in a trip carries with him or her. At step S703, a guide information fit for an itinerary is read out and transmitted to digital camera 1. In step S704, it is detected if an image data is received and if yes, a flow proceeds to step S705 and if not, a flow gets back to step S701. In step S705, an image data of a guide information which was transmitted shortly while ago is replaced with a received image data.

Server computer 2 performs processing on not only a single digital camera, but also plural cameras to respond to a plurality of digital cameras. Also, by not transmitting a guide information to a digital camera automatically in accordance with a GPS information and an itinerary, an attendant and so may transmit a guide information to each digital camera manually.

Next, an operation to create a filename and a title of an image data automatically by referring to a guide information in digital camera 1 is explained. In digital camera 1, for example, when a guide information about the Tokyo Eiffel Tower had been viewed until a picture was taken, a filename of a taken image data is named as tokyotower001 or so and an image data is titled as a Tokyo Eiffel Tower.

Figure 15:
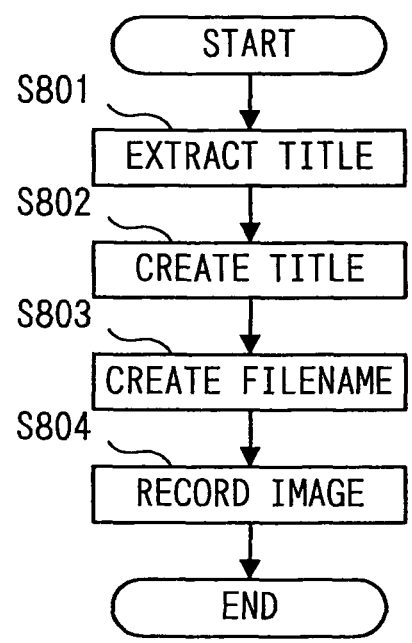
FIG. 15 is a flow chart of an operation to be executed in digital camera 1.

A more concrete operation for creation of a filename and a title of a taken image data is explained as below. FIG. 15 is a flow chart showing an operation to be executed in digital camera 1. A flow starts when an image processing ends. In step S801, a title part of a guide information viewed shortly before a picture was taken is extracted. In step S802, a title of a guide information is created as a title of a taken image data. In step S803, a filename of the taken image data is created in such a way that a serial number is added to a title of a guide information. The reason why a serial number is put is to prevent from creating the same filenames when plural shots are taken at the same place. In step S804, by putting a filename and a title to an image data, the image data is recorded on a memory card.

When a taken image data is recorded into server computer 2, processing to create a filename and a title is explained.

Figure 16:
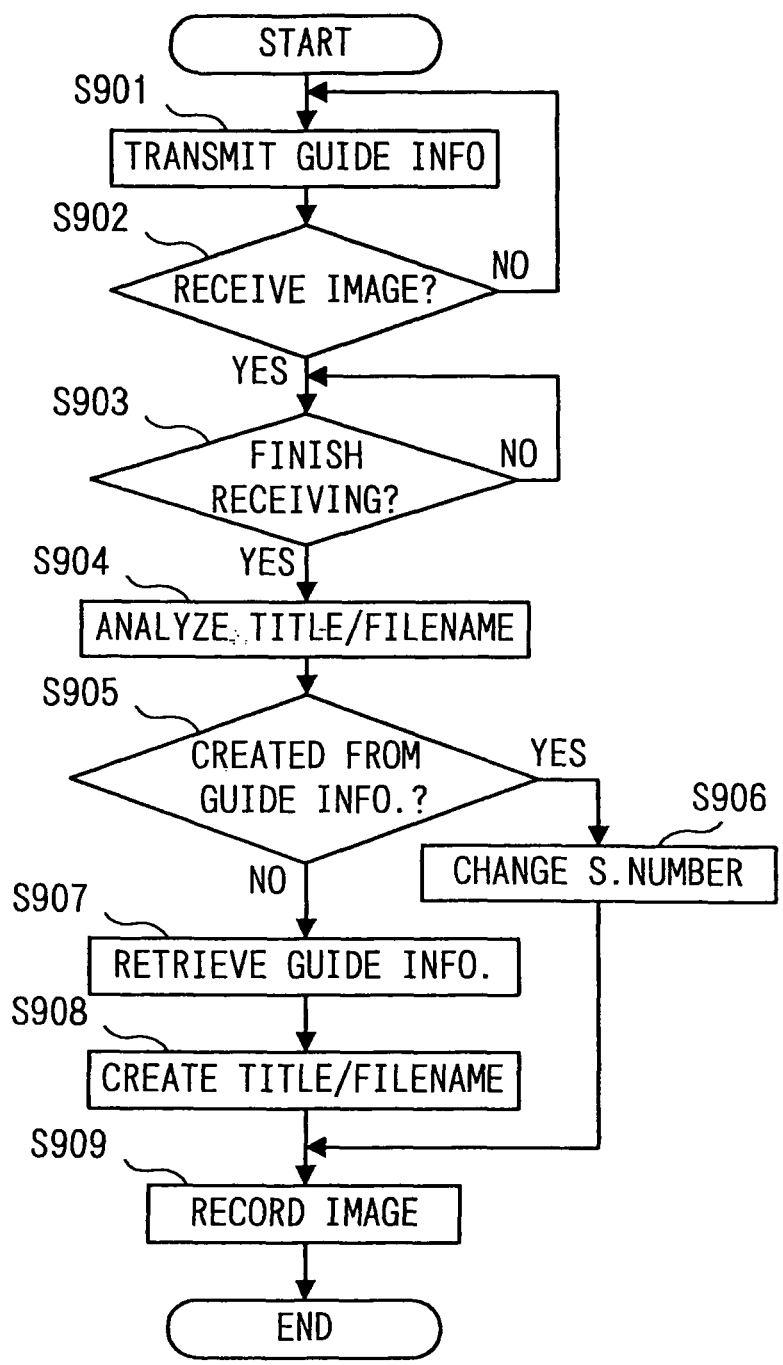
FIG. 16 is a flow chart to explain processing to create a filename and title to be performed in server computer 2.

First, an operation of server computer 2 is explained. FIG. 16 is a flow chart showing a processing to create a filename and a title to be executed in server computer 2.

In step S901, a guide information is transmitted to digital camera 1. Server computer 2 always transmits to digital camera 1 a necessary guide information right now about a sightseeing spot. In step S902, it is detected if an image data is received from digital camera 1. If yes, a flow proceeds to step S903 and if not, a flow gets back to step S901.

In step S903, it is detected if reception of an image data is finished. If yes, a flow proceeds to step S904 and if not, detection continues. In step S904, a filename and a title of a received image data are analyzed. In step S905, it is detected if a filename and a title of an image data are created from a guide information. If yes, a flow proceeds to step S906 and if not, a flow proceeds to step S907. In step S906, without change of a title, a serial number of a filename is so changed as no to be the same number of other filename.

In step S907, a guide information, which has been transmitted to digital camera 1 before shooting, is retrieved. In step S908, a filename and a title are created based on a retrieved information. In step S909, an image data is recorded into a given folder registered in digital camera 1

Figure 17:
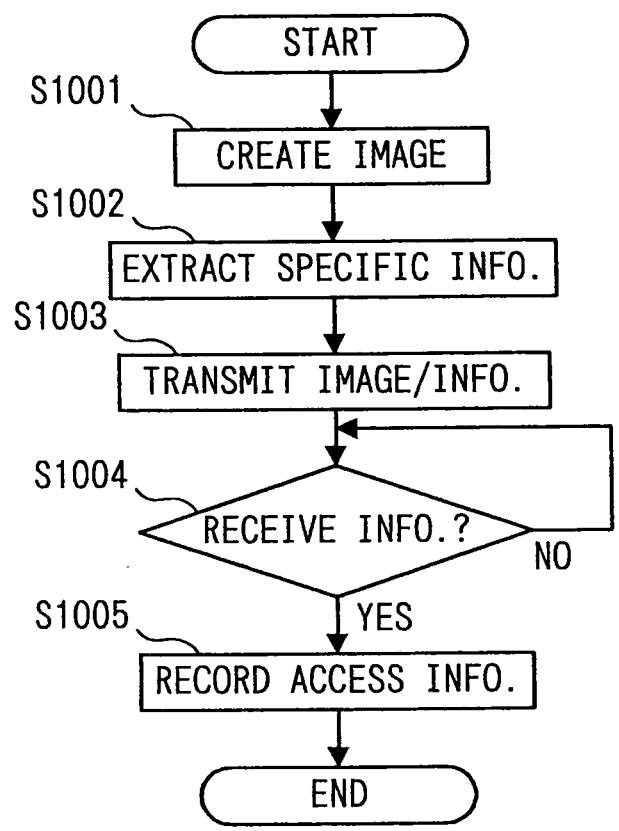
FIG. 17 is a flow chart of an operation to be executed in digital camera 1.

As stated in the above, with regard to a guide information about a sightseeing spot provided by server computer 2, any of information responding to a request from digital camera 1 or in accordance with an itinerary or manually transmitted by an tour attendant and the like may be accepted. Next, an operation of digital camera 1 is explained. FIG. 17 is a flow chart of an operation to be executed in digital camera 1. A flow starts by detecting a full depression of shutter release button 111 provided in digital camera 1.

In step S1001, a picture taking is executed and an image data is created. In step S1002, a specific information to specify a guide information received from server computer 2 ahead of shooting is extracted. In step S1003, an image data and a specific information about a guide information are transmitted to server computer 2. In step S1004, it is detected if information about a filename, address of a recorded data and so on to thereby gain access to a transmitted image data is received. If yes, a flow proceeds to step S1005 and if not, detection continues. In step S1005, an access information is recorded into built-in memory 105.

Like this, by receiving information to gain access to a transmitted image data and storing it into digital camera 1, an image data transmitted by digital camera 1 may be accessed with easy. And information transmitted from server computer 2 is not only a guide information about an interesting spot and the like, but also an admission ticket information, a transportation ticket information, a hotel room key information, various discount coupon information and so forth. Admission becomes possible by carrying digital camera 1 or a cellular phone with a distributed ticket information and/or showing the distributed ticket information via a monitor screen or having the distributed ticket information read. Also, a ticket information is not transmitted from server computer 2, but a necessary ticket information has been recorded into a memory card beforehand and the like, and a recorded memory card may be made available for sale.

An operation to transmit a ticket information is explained. A ticket information and a transportation ticket information are transmitted respectively in accordance with an itinerary and a GPS information. Therefore, even if digital camera 1 was lost, information will not be transmitted thereto unless a user goes to the spot and at the time specified by an itinerary or a GPS and thus, an abuse can not be committed with ease. A measurement to cancel a distribution at the time of a loss of digital camera 1 can prevent someone from using information.

By respective distribution in accordance with an itinerary and a GPS information, a memory capacity of a camera is not wasted due to a ticket information. A distributed ticket information is related to a ticket, that is, an already-purchased ticket and a reserved one. In addition, A ticket information about recommending an advance ticket purchase or a ticket necessary on the spot may be distributed.

Figure 18:
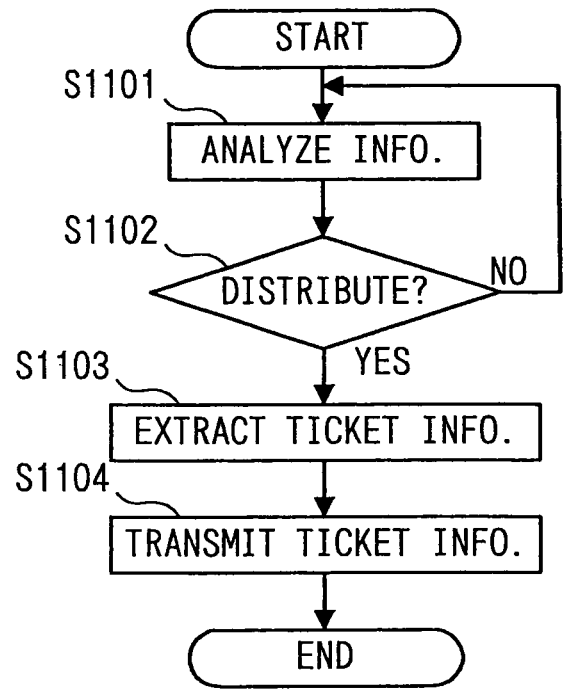
FIG. 18 is a flow chart of an operation to be executed in server computer 2.

A concrete operation to distribute a ticket information and the like is explained. FIG. 18 is a flow chart of an operation to be executed in server computer 2. In step S1101, a GPS information and an itinerary information are analyzed. In step S1102, from a result of an analysis, it is judged if a ticket information must be distributed. If yes, a flow proceeds to step S1103 and if not, a flow gets back to step S1101. In step S1103, a necessary ticket information is extracted from a result of an analysis. In step S1104, the extracted ticket information is distributed to digital camera 1.

In the above operation, distribution of a ticket information is explained, but both of information about a ticket and a guide may be distributed at a time although a separate distribution is possible. In this case, a page of a guide information in which a ticket information is embedded may be distributed or a separate page may be distributed simultaneously. In this case, with no specific operation to distribute a ticket information and by distributing a ticket information with a given guide information, a determining of distribution time becomes enough.

In the above embodiment, a ticket information is distributed based upon both of a GPS information and an itinerary information, but a ticket information may be separately distributed based on either a GPS or an itinerary information. Or a distribution time of a ticket information may be determined based on another information other than a GPS and an itinerary information.

What is claimed is:

1. A digital camera comprising:
 a communicator that communicates with another digital camera that creates digital image data by photographing a subject and receives the digital image data from the another digital camera, wherein the communicator receives a raw image data corresponding to an output produced from an imaging sensor when the digital camera is a same model as the another digital camera; and
 a processor that processes the digital image data based upon image format information set for photographing at the digital camera that receives the digital image data so that the digital image data processed by the processor is handled in a same manner as digital image data created by photographing at the digital camera, wherein
 when transfer of a received digital image data outside is set, the communicator automatically transfers the digital image data processed by the processor to a server computer.

2. A digital camera comprising:
 a communicator that communicates with another digital camera that creates digital image data by photographing a subject and receives the digital image data from the another digital camera, wherein the communicator receives a raw image data corresponding to an output produced from an imaging sensor when the digital camera is a same model as the another digital camera; and
 a processor that processes the digital image data based upon image format information set for photographing at the digital camera that receives the digital image data so that the digital image data processed by the processor is handled in a same manner as digital image data created by photographing at the digital camera, wherein the digital image data received from the another digital camera is not recorded in a memory card mounted on the digital camera and the digital image data received from the another digital camera is transmitted to a server computer.

* * * * *